United States Patent Office 2,816,077
Patented Dec. 10, 1957

2,816,077
METHOD OF CLEANING DEPOSITS FROM HARD SURFACES

Armand Jean Courtier, Meudon, France, assignor to Societe Anonyme des Manufactures des Glaces et Produits Chimiques de Saint-Gobain, Chauny & Cirey, Paris, France No Drawing. Application September 21, 1951, Serial No. 247,773

Claims priority, application France November 22, 1950

1 Claim. (Cl. 252—155)

This invention relates to the cleaning, scouring and pickling of various materials such as stones, tiles, and metal, particularly rusted metal, and to new and superior compositions for such purposes.

The removal of adhering deposits, such as rust from iron, from hard bodies of metallic or stony aspect is very difficult, frequently requiring long immersion in hot acidic solutions, or excessive time and labor with scouring preparations that abrade the material as well as the deposit.

Frequently, the pickling solutions are seriously corrosive, cause a hazard in the plant, are handled only with precaution, and are stored and shipped in expensive containers.

It is an object of this invention to provide a cleaning, scouring and pickling preparation that is effective, safe, readily stored and shipped in cheap containers, and capable of use with mild abrasives that are relatively incapable of attacking the encrusted body while being capable within the preparation of attacking the deposits.

The objects of the invention are accomplished, generally speaking, by a scouring and pickling composition comprising cyanamide dihydrochloride, which is of the empirical formula $CN_2H_2$—$2HCl$, the space formula being represented as

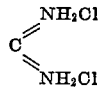

This material may be made by reacting cyanamide with HCl gas in absolute ether in an anhydrous reaction, the gas being passed through the cyanamide until absorption ceases. A better and a novel method is to dissolve cyanamide in ethyl acetate and bubble HCl gas through the solution. The hydrochloride separates out and the solvent is decanted, filtered or evaporated off. Preferably some of the ethyl acetate is left in the hydrochloride, the amount left by filtration being beneficial.

In employing the hydrochloride for cleaning, scouring or pickling, it is wetted by or dissolved in water, a mild abrasive being added if the composition is to be used for scouring. The composition has great cleansing power and a particularly marked ability to dissolve rust and other metal oxides.

Cyanamide dihydrochloride is crystalline, stable, and stores without special precaution in cardboard boxes, wood, or even in metal, painted or not. The compositions including cyanamide dihydrochloride, the ethyl acetate or the like, and/or the fuller's earth or the like, store with equal ease and require no special precautions. All such compositions are made useful simply by dissolving in water or by wetting as the case may be.

It is possible to explain the action on a basis of the hydrolysis of the cyanamide dihydrochloride to cyanamide and HCl, but the theory is not wholly satisfactory, as the composition is better than a mere mixture of HCl, cyanamide and water.

The following examples illustrate the invention and do not constitute a limitation on the generality of what has been said elsewhere herein.

Example I 21 kg. of free cyanamide were dissolved in 100 liters of ethyl acetate and 36.5 kg. of HCl gas were bubbled through the solution while the temperature was held below 50° C. by refrigeration. The cyanamide dihydrochloride precipitated in crystals and were separated by filtration, yielding 61 kg. of the hydrochloride, which retained a little of the ethyl acetate, which could be removed by drying, but was allowed to remain as constituting a beneficial ingredient.

Example II

The cyanamide dihydrochloride of Example I was mixed with 50% of a natural pulverized silica, producing a paste which was used to remove rust from steel by mixing with water and scouring.

In a similar test all the ethyl acetate was removed and the silica made a dry powder with the cyanamide dihydrochloride until wetted by water.

Example III 10 kg. of the product obtained in Example I were dissolved in 90 liters of water. The solution was kept at 15° C. and there was submerged in it some very rusty sheet iron. After an hour of immersion the rust was either detached or so fully loosened that simple brushing removed it.

Example IV

The same solution produced in Example I was employed as in Example III at 40° C. The rusty plates were completely cleaned of rust in 25 minutes.

When the same full scale experiment was carried out at 70° C. with the same solution the time required for complete cleansing was reduced five minutes.

Example V

The concentration of the solution, used in Example III was increased 20%, employing 20 kg. of the product of Example I in 80 liters of water. At a temperature of 15° C. the removal of rust from iron plates required 20–30 minutes.

At 40° C. the same solution removed the rust in 10 minutes.

At 70° C. only one minute was required for the complete removal of the rust.

Example VI

A solution was made using 5 kg. of the product of Example I in 95 liters of water. Rusty iron plates were submerged in portions of this solution at different temperatures.

At 15° C. it required about one hour and a half to remove the rust.

At 40° C. it required 20–30 minutes to remove the rust.

At 70° C. only seven minutes were required to remove the rust.

Example VII

A mixture was prepared from the following ingredients:

50 kg. of the product of Example I.
50 kg. of sawdust.
1200 cc. of amyl acetate.
10 kg. of a solution of the alkyl-sulfonate of sodium of 40% concentration.

A Werner mixer was used. 0.670 kg. of this mixture was used to scour 100 sq. m. of ceramic tile flooring.

The tiles were sprinkled with the composition, wet with hot water, rubbed lightly, and rinsed. The appearance of the ceramic took on a new luster that was quite equal to new.

*Example VIII*

In this test, Example VII was carried out except that infusorial earth replaced the sawdust. This mixture, which is much more voluminous than the one made with sawdust, gave results analogous to those of Example 7.

As evidenced by the foregoing examples, the activity of the composition can be increased by increasing its temperature or its concentration or both. Small concentrations work well but require more time than somewhat more concentrated solutions to complete the same cleansing. The activity of the solution on rust and other metal oxides is astonishing. All the metal oxides that form on metal surfaces in the air are readily attacked by the compositions. Stones and stonewear are easily cleaned by the compositions, and glazed objects are restored to their pristine luster.

The invention contemplates cyanamide dihydrochloride, and its compositions with organic solvents, with mild or even with strong abrasives, and with water as a detergent, a scouring agent, and a pickling solution. The reason for its successful action is not altogether plain, but it is very successful.

Because it can be stored without decomposing it can be stored in cheap containers, thus lowering the cost of storage. Being of inert character it needs no special precaution during handling. Needing only the addition of water, it is useful without expensive solvents and diluents and without complex preparation. The proportions of water to cyanamide dihydrochloride not being critical, no particular amounts need be measured out, except to attain an optimum efficiency for a particular type of work.

As many apparently widely different embodiments of the present invention may be made without departing from the spirit and scope thereof, it is to be understood that the invention is not limited to the specific embodiments.

What is claimed is:

The method of cleaning adhering deposits from a hard body of metallic, stony, and ceramic aspect such as metal, stone, tile, and glaze which comprises scouring the body with a composition comprising cyanamide hydrochloride, water, and an abrasive.

References Cited in the file of this patent

UNITED STATES PATENTS

| | | |
|---|---|---|
| 1,733,299 | Fairbairn et al. | Oct. 29, 1929 |
| 2,250,379 | Johnson | July 22, 1941 |
| 2,257,186 | Orthner et al. | Sept. 30, 1941 |

OTHER REFERENCES

Cyanogen Compounds, Williams, Arnold & Co., London, 2d edition (1948), pages 18, 19.

Organic Chemistry, Richter, P. Blakiston's Son & Co., Phila. (1919). vol. 1, pages 439, 471, 472.

Industrial Solvents, Mellan, Reinhold Pub. Co., N. Y. (1939), pages 298, 299.